(12) United States Patent (10) Patent No.: US 12,580,373 B2
Sato et al. (45) Date of Patent: Mar. 17, 2026

(54) ATTACHMENT STRUCTURE OF FLAT WIRE HARNESS

(71) Applicants:Sumitomo Wiring Systems, Ltd., Mie (JP); KABUSHIKI KAISHA TOYOTA JIDOSHOKKI, Aichi (JP); TOYOTA JIDOSHA KABUSHIKI KAISHA, Aichi (JP)

(72) Inventors: Tatsumi Sato, Mie (JP); Kazuhiro Nishimura, Mie (JP); Hirozumi Okaniwa, Mie (JP); Tomohiko Tateishi, Mie (JP); Tatsuya Aida, Aichi (JP); Mitsuhiro Kato, Aichi (JP); Akinori Ishikawa, Aichi (JP); Kazuhiro Kusuyama, Aichi (JP)

(73) Assignees: SUMITOMO WIRING SYSTEMS, LTD., Mie (JP); KABUSHIKI KAISHA TOYOTA JIDOSHOKKI, Aichi (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 196 days.

(21) Appl. No.: 18/480,007

(22) Filed: Oct. 3, 2023

(65) Prior Publication Data

US 2024/0128733 A1 Apr. 18, 2024

(30) Foreign Application Priority Data

Oct. 13, 2022 (JP) ................................. 2022-164521

(51) Int. Cl.
*H02G 3/30* (2006.01)
*H01B 7/00* (2006.01)
(52) U.S. Cl.
CPC ............. *H02G 3/30* (2013.01); *H01B 7/0045* (2013.01)

(58) Field of Classification Search
CPC ..... H02G 3/30; B60R 16/0215; H01B 7/0045
See application file for complete search history.

(56) References Cited

U.S. PATENT DOCUMENTS

2017/0327060 A1* 11/2017 Nakajima ........ H01B 13/01254
2020/0141518 A1* 5/2020 Nakano .................... H02G 3/30
(Continued)

FOREIGN PATENT DOCUMENTS

GB 2271143 4/1994
JP 6-24212 U 3/1994
(Continued)

OTHER PUBLICATIONS

Japan Office Action issued in Japan Patent Application No. 2022-164521, dated Oct. 1, 2024, together with English translation thereof.

*Primary Examiner* — Paresh Paghadal
(74) *Attorney, Agent, or Firm* — Greenblum & Bernstein, P.L.C.

(57) ABSTRACT

An attachment structure of a flat wire harness includes: an attachment target member; a flat wire harness; and an attachment part. In the flat wire harness, a through hole is formed in a part of a base material where a plurality of electrical wires are not disposed. The attachment part includes a rod-like part passing through the through hole, a fixing part provided to a first end portion of the rod-like part to fix the rod-like part to the attachment target member, and a retaining part provided to a second end portion of the rod-like part to prevent the rod-like part from coming out of the through hole. An outer size of the retaining part is larger than a dimension of the through hole, and the dimension of the through hole is equal to or larger than a thickness of the rod-like part.

1 Claim, 10 Drawing Sheets

(56)　　　　　　References Cited

U.S. PATENT DOCUMENTS

| | | | |
|---|---|---|---|
| 2020/0198557 A1 * | 6/2020 | Nishimura | H02G 3/30 |
| 2020/0343708 A1 * | 10/2020 | Kamei | H01B 7/0045 |
| 2023/0174002 A1 * | 6/2023 | Sakurai | B60R 16/02 |
| | | | 174/72 A |

FOREIGN PATENT DOCUMENTS

| | | | |
|---|---|---|---|
| JP | 7-235745 | 9/1995 | |
| JP | 2001-251742 | 9/2001 | |
| JP | 2020-145175 | 9/2020 | |
| JP | 2020-198772 | 12/2020 | |
| WO | WO-2014175048 A1 * | 10/2014 | B60R 16/0215 |

* cited by examiner

F I G. 4
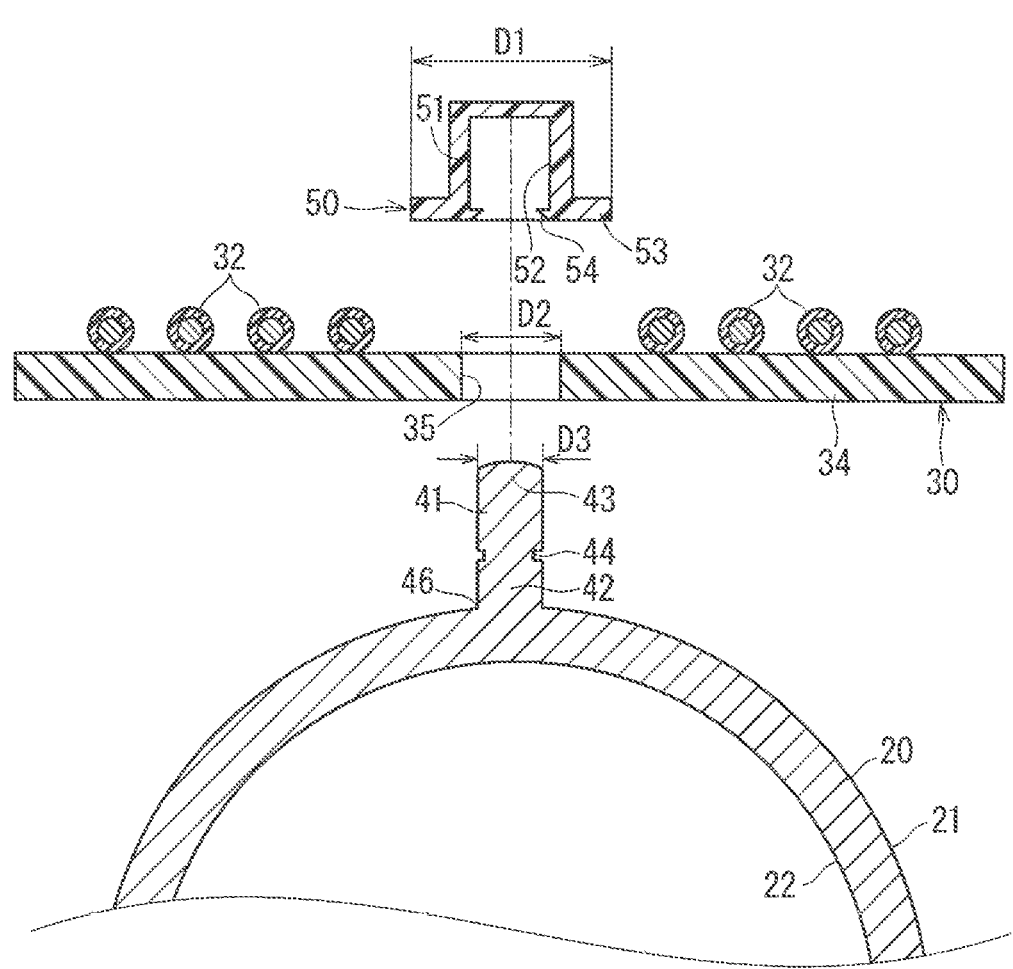

F I G. 5
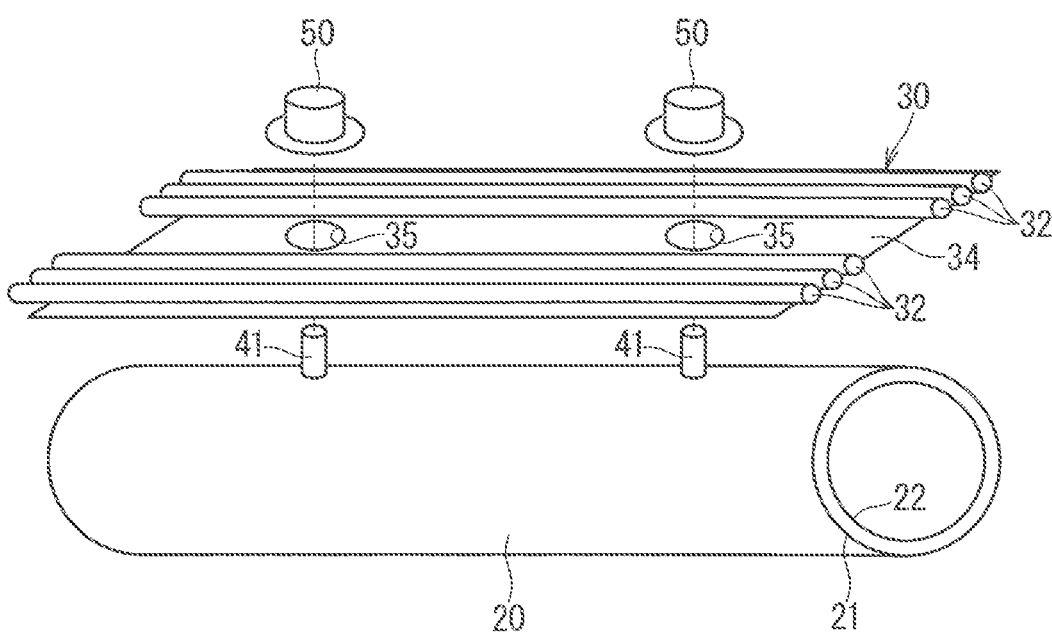
F I G. 6
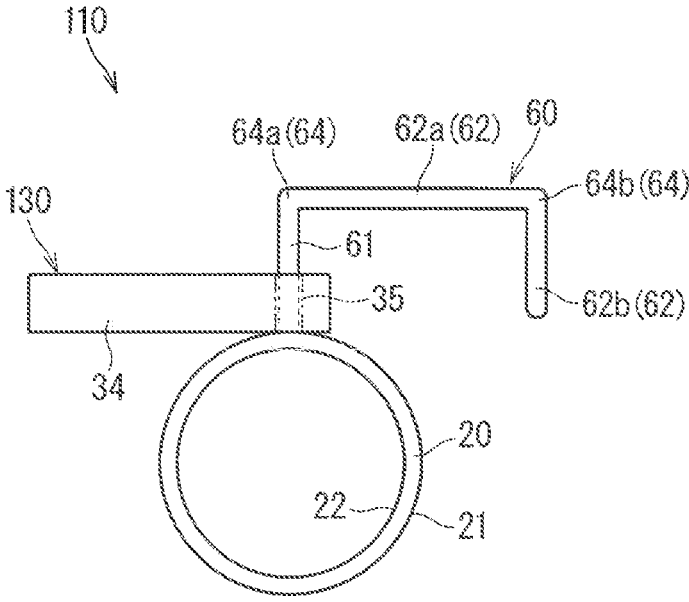

F I G. 11
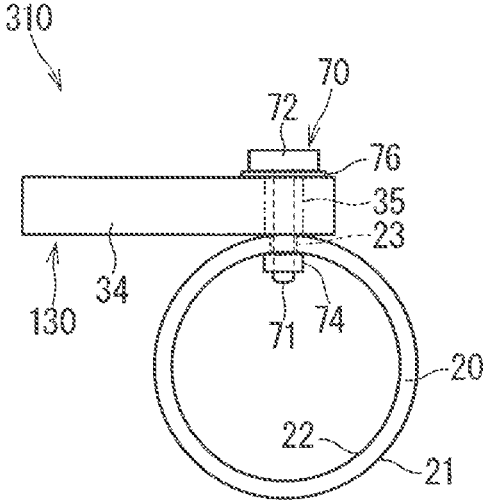
F I G. 12
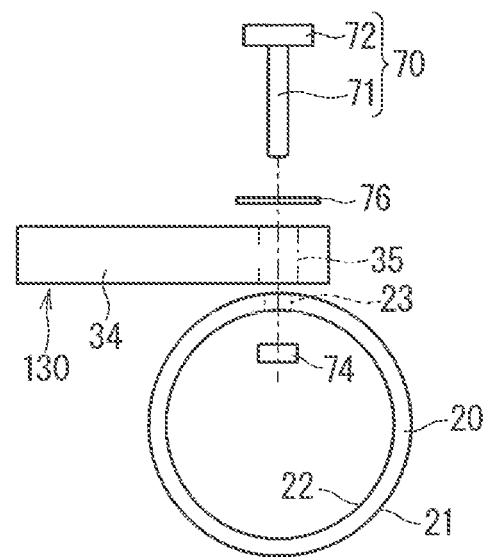

F I G. 13
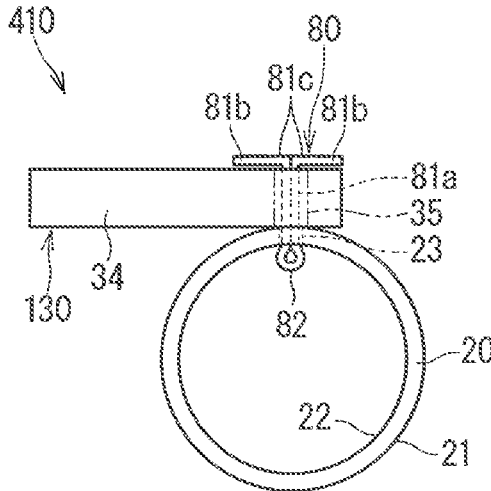
F I G. 14
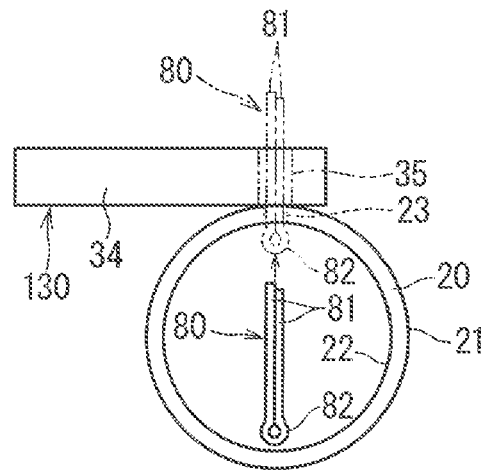

ATTACHMENT STRUCTURE OF FLAT WIRE HARNESS

BACKGROUND OF THE INVENTION

Field of the Invention

The present disclosure relates to an attachment structure of a flat wire harness.

Description of the Background Art

Japanese Patent Application Laid-Open No. 2020-145175 discloses a technique of fixing a flat wiring member to a vehicle.

SUMMARY

The flat wire harness has a large width dimension compared with a thickness dimension, thus the flat wire harness easily obstructs vision of an operator at a time of an attachment operation of attaching the flat wire harness to the attachment target member. It is desired that the attachment operation of the flat wire harness is simplified.

Accordingly, an object is to provide a technique capable of simplifying an attachment operation of a flat wire harness.

An attachment structure of a flat wire harness according to the present disclosure is an attachment structure of a flat wire harness including: an attachment target member; a flat wire harness disposed along an outer surface of the attachment target member; and an attachment part attaching the flat wire harness to the attachment target member, wherein the flat wire harness includes a plurality of wire-like transmission members and a base material holding the plurality of wire-like transmission members in a flatly-arranged state, a through hole is formed in a part of the base material where the plurality of wire-like transmission members are not disposed, the attachment part includes a rod-like part passing through the through hole, a fixing part provided to a first end portion of the rod-like part to fix the rod-like part to the attachment target member, and a retaining part provided to a second end portion of the rod-like part to prevent the rod-like part from coming out of the through hole, and an outer size of the retaining part is larger than a dimension of the through hole, and the dimension of the through hole is equal to or larger than a thickness of the rod-like part.

According to the present disclosure, an attachment operation of a flat wire harness can be simplified.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is an exploded cross-sectional view illustrating the attachment structure of the flat wire harness.

FIG. 5 is an explanation diagram illustrating attachment of the flat wire harness.

FIG. 6 is a front view illustrating an attachment structure of a flat wire harness according to an embodiment 2.

FIG. 11 is a front view illustrating an attachment structure of a flat wire harness according to an embodiment 3.

FIG. 12 is an explanation diagram illustrating attachment of the flat wire harness.

FIG. 13 is a front view illustrating an attachment structure of a flat wire harness according to an embodiment 4.

FIG. 14 is an explanation diagram illustrating attachment of the flat wire harness.

DESCRIPTION OF THE PREFERRED EMBODIMENTS

Description of Embodiment of Present Disclosure

Figure 1:
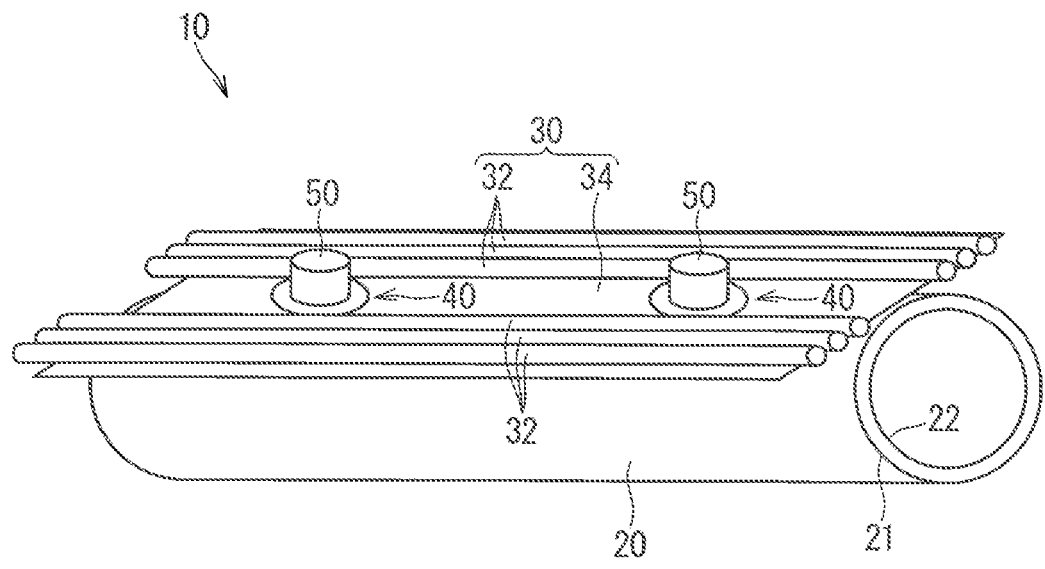
FIG. 1 is a perspective view illustrating an attachment structure of a flat wire harness according to an embodiment 1.

Embodiments of the present disclosure are listed and described firstly.

An attachment structure of a flat wire harness according to the present disclosure is as follows.

(1) An attachment structure of a flat wire harness includes: an attachment target member; a flat wire harness disposed along an outer surface of the attachment target member; and an attachment part attaching the flat wire harness to the attachment target member, wherein the flat wire harness includes a plurality of wire-like transmission members and a base material holding the plurality of wire-like transmission members in a flatly-arranged state, a through hole is formed in a part of the base material where the plurality of wire-like transmission members are not disposed, the attachment part includes a rod-like part passing through the through hole, a fixing part provided to a first end portion of the rod-like part to fix the rod-like part to the attachment target member, and a retaining part provided to a second end portion of the rod-like part to prevent the rod-like part from coming out of the through hole, and an outer size of the retaining part is larger than a dimension of the through hole, and the dimension of the through hole is equal to or larger than a thickness of the rod-like part.

According to the attachment structure of the flat wire harness in (1), the dimension of the through hole is equal to or larger than the rod-like part, thus the rod-like part is easily inserted into the through hole at a time of an attachment operation of attaching the flat wire harness, and the attachment target part of the attachment target member is visually recognized easily from the through hole before the rod-like part is inserted. Accordingly, the attachment operation of the flat wire harness is simplified.

(2) In the attachment structure of the flat wire harness according to (1), the fixing part may integrally fix the attachment target member and the rod-like part. Accordingly, the rod-like part can be inserted into the through hole by moving the base material, and the rod-like part can be visually recognized through the through hole.

(3) In the attachment structure of the flat wire harness according to (2), it is applicable that the rod-like part is a stud bolt, the retaining part is a fastening member fastened to the stud bolt, and an outer size of the fastening member may be larger than the dimension of the through hole. Accordingly, the fastening member prevents the base material from coming out of the stud bolt.

(4) In the attachment structure of the flat wire harness according to (3), it is applicable that a locking concave part is formed in an outer peripheral part of the stud bolt, the fastening member includes a cap body covering the stud bolt, a flange extending to an outer side from an outer peripheral part of the cap body, and an elastic locking piece formed in an inner peripheral part of the cap body to be locked to a peripheral edge of the locking concave part of the stud bolt, and an outer size of the flange is larger than the dimension of the through hole. Accordingly, the fastening member can be fastened by pressing the fastening member to the stud bolt.

(5) In the attachment structure of the flat wire harness according to (2), a pin may be continuously provided as the rod-like part and the retaining part. Accordingly, the flat wire harness can be attached to the attachment target member by the pin integrally formed with the attachment target member. Accordingly, a component in a separated form at a time of starting the attachment operation is reduced.

(6) In the attachment structure of the flat wire harness according to (5), it is applicable that the pin has rigidity to be hardly bended and deformed, the rod-like part outwardly extends from the outer surface of the attachment target member along a first direction, and the retaining part extends from the second end portion of the rod-like part along a second direction different from the first direction. Accordingly, the base material is moved along the pin toward a base end of the pin while a tip end of the pin is inserted into the through hole, thus the flat wire harness can be attached to the attachment target member.

(7) In the attachment structure of the flat wire harness according to (5), it is applicable that the pin has rigidity so that the pin can be bended and deformed and can keep a state of being bended and deformed, and is bended and deformed so that a part of the pin is located on an outer side of the through hole. Accordingly, the pin passing through the through hole is bended and deformed, thus the flat wire harness is attached to the attachment target member.

(8) In the attachment structure of the flat wire harness according to (1), it is applicable that the fixing part includes an insert hole formed in the attachment target member, the rod-like part is inserted into the insert hole, and the dimension of the through hole is larger than a dimension of the insert hole. Accordingly, the insert hole is visually recognized easily through the through hole.

(9) In the attachment structure of the flat wire harness according to (8), it is applicable that a bolt including a shaft and a head and a fastening member fastened to the bolt is provided, the shaft serves as the rod-like part, the head serves as one of the fixing part and the retaining part, and the fastening member serves as another one of the fixing part and the retaining part. Accordingly, the insert hole is visually recognized easily through the through hole, thus the bolt can be easily inserted into the through hole in the base material and the insert hole in the attachment target member.

(10) In the attachment structure of the flat wire harness according to (8), it is applicable that a split pin including a tail and a head is provided, the tail includes a part serving as the rod-like part and a part serving as one of the fixing part and the retaining part, and the head serves as another one of the fixing part and the retaining part. Accordingly, the insert hole is visually recognized easily through the through hole, thus the tail can be easily inserted into the through hole in the base material and the insert hole in the attachment target member.

DETAILED DESCRIPTION OF EMBODIMENT OF PRESENT DISCLOSURE

Specific examples of an attachment structure of a flat wire harness according to the present disclosure are described hereinafter with reference to the drawings. The present disclosure is not limited to these exemplifications, but is indicated by claims, and it is intended that meanings equivalent to claims and all modifications within a scope of claims are included.

Embodiment 1

Figure 2:
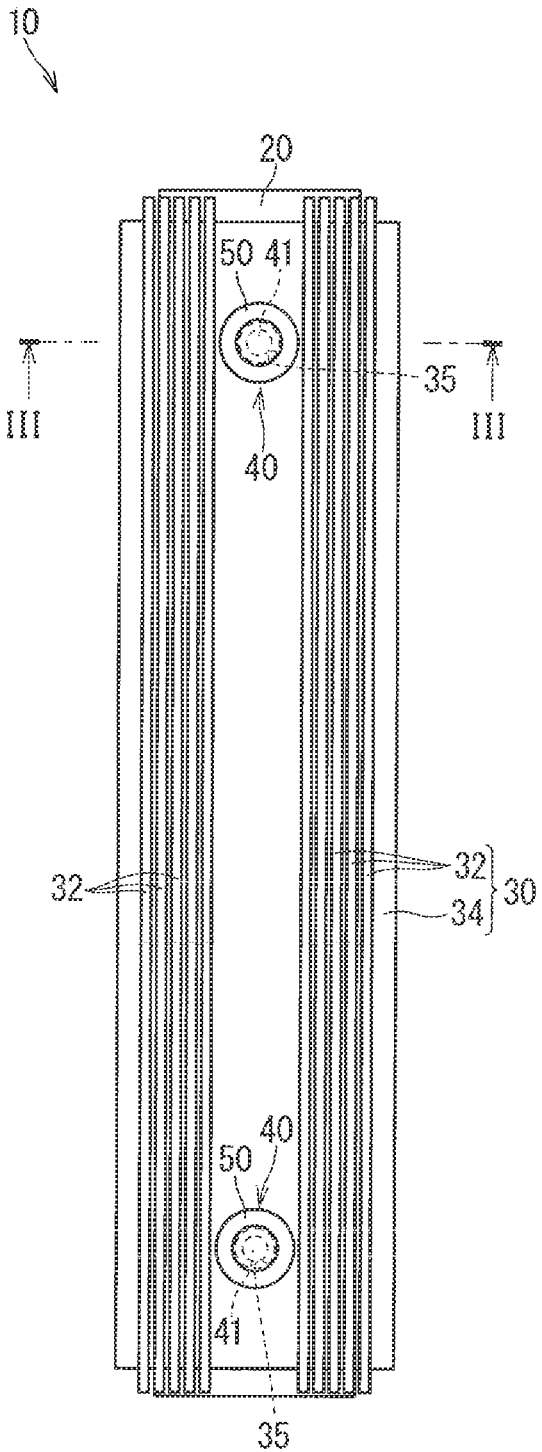
FIG. 2 is a plan view illustrating the attachment structure of the flat wire harness.
Figure 3:
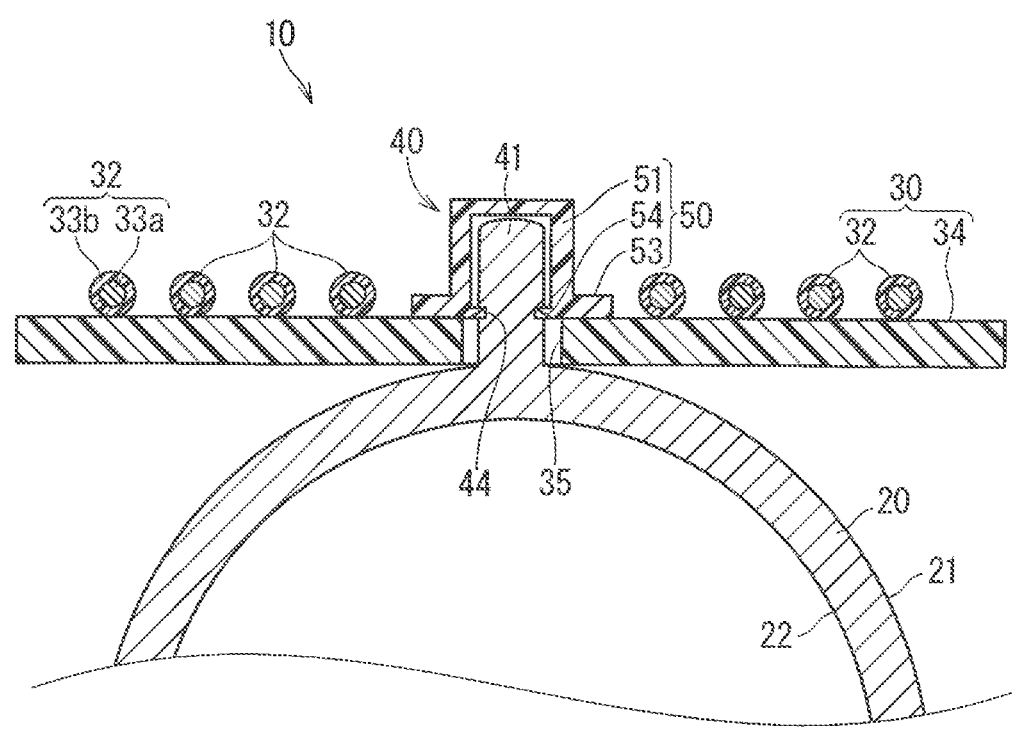
FIG. 3 is a cross-sectional view along a III-III line in FIG. 2.

An attachment structure of a flat wire harness according to an embodiment 1 is described hereinafter. FIG. 1 is a perspective view illustrating an attachment structure 10 of the flat wire harness according to the embodiment 1. FIG. 2 is a plan view illustrating the attachment structure 10 of the flat wire harness. FIG. 3 is a cross-sectional view along a III-III line in FIG. 2. FIG. 4 is an exploded cross-sectional view illustrating the attachment structure 10 of the flat wire harness. FIG. 5 is an explanation diagram illustrating attachment of a flat wire harness 30.

The attachment structure 10 of the flat wire harness includes an attachment target member 20, the flat wire harness 30, and an attachment part 40. The flat wire harness 30 is disposed along an outer surface 21 of the attachment target member 20. The attachment part 40 attaches the flat wire harness 30 to the attachment target member 20.

The attachment target member 20 is a member such as a frame, a reinforcement, or a panel disposed in a vehicle, for example. In the description herein, the attachment target member 20 is a reinforcement disposed in an installment panel. The reinforcement 20 is formed into a cylindrical shape, for example. The reinforcement 20 includes the outer surface 21 and an inner surface 22. The outer surface 21 is an outer peripheral surface of a cylinder, and the inner surface 22 is an inner peripheral surface of the cylinder.

The flat wire harness 30 includes a plurality of wire-like transmission members 32 and a base material 34. It is sufficient that the wire-like transmission member 32 is a wire-like member transmitting electrical power or light. The wire-like transmission member 32 is an electrical wire transmitting electrical power or an optical fiber transmitting light. In the description herein, the wire-like transmission member 32 is an electrical wire. Each of the plurality of electrical wires 32 is a covering electrical wire. The covering electrical wire includes a conductor core wire 33*a* and a covering layer 33*b* covering the conductor core wire 33*a*.

The base material 34 holds the plurality of electrical wires 32 in a flatly-arranged state. A structure of holding the plurality of electrical wires 32 in the flatly-arranged state on the base material 34 is not particularly limited. For example, each of the plurality of electrical wires 32 may be fixed to the base material 34 by welding (including ultrasonic welding, heating and pressurizing welding, hot-air welding, high-frequency welding, or welding by a solvent), an adhesive agent, or a gluing agent. In this case, the plurality of electrical wires 32 can be kept in a flat state more easily. Each of the plurality of electrical wires 32 may be fixed to the base material 34 by a sewing thread. The plurality of electrical wires 32 and the base material 34 may be banded by a banding member wound around the plurality of electrical wires 32 and the base material 34. For example, the banding member may be a banding band (also referred to as a cable tie) or an adhesive tape.

An extension direction of the plurality of electrical wires 32 is an extension direction of the flat wire harness 30. A parallel direction of the plurality of electrical wires 32 is a width direction of the flat wire harness 30. A lamination direction of the electrical wire 32 and the base material 34 is a thickness direction of the flat wire harness 30. In the flat wire harness 30, a dimension in the extension direction and a dimension in the width direction are larger than a dimension in the thickness direction. The width dimension of the flat wire harness 30 may be equal to or larger than a width dimension of the reinforcement 20, for example.

Herein, the base material 34 is formed into a sheet-like shape. A through hole 35 is formed in a part of the base material 34 where the plurality of electrical wires 32 are not disposed. Herein, the through hole 35 is not overlapped with the electrical wire 32. The through hole 35 may be partially overlapped with the electrical wire 32. A part of attachment part 40 passes through the through hole 35 to attach the flat wire harness 30 to the attachment target member 20. The through hole 35 can also be used as a window part for an operator to visually recognize an attachment target part of the attachment target member 20 over the flat wire harness 30 at the time of attaching the flat wire harness 30 to the attachment target member 20.

When the banding member is wound around the plurality of electrical wires 32 and the base material 34, the through hole 35 may be provided in a position overlapped with the banding member. In this case, it is sufficient that a hole for passing the attachment part 40 is also formed in the banding member. The banding member may also be provided in a position not to be overlapped with the through hole 35. In this case, there is no need to form a hole for passing a part of the attachment part 40 in the banding member.

A parallel structure of the plurality of electrical wires 32 is not particularly limited as long as the plurality of electrical wires 32 are flatly arranged. For example, the plurality of electrical wires 32 may be disposed on a main surface of the base material 34 in a discrete state. The plurality of electrical wires 32 may be held in a state of being arranged in a row or being arranged to be overlapped with each other. In each row, the electrical wires 32 adjacent to each other may be separated from each other as illustrated in FIG. 3. In each row, the electrical wires 32 adjacent to each other may have contact with each other.

The plurality of electrical wires 32 may be disposed on the main surface of the base material 34 in a bundled state. In this case, the plurality of electrical wires 32 may be divided into a plurality of groups. Specifically, the plurality of electrical wires 32 are bundled separately for each of the plurality of groups to form a plurality of bundles. The plurality of bundles are arranged along the main surface. Accordingly, the plurality of electrical wires 32 can be kept in a flat state.

The base material 34 includes a first main surface and a second main surface each facing a side opposite to each other. Herein, the plurality of electrical wires 32 are disposed on only the first main surface of the base material 34. The electrical wire 32 is not disposed on the second main surface. The plurality of electrical wires 32 may be disposed separately on the first main surface and the second main surface of the base material 34. When the plurality of electrical wires 32 are disposed on only the first main surface of the base material 34, a surface of the base material 34 facing the outer surface 21 of the reinforcement 20 may be the first main surface or the second main surface.

The flat wire harness 30 may be a band-like wiring member made up of a plurality of wire-like conductors in a parallel state covered by an insulating material such as a film, that is a flexible flat cable, for example. In this case, the wire-like conductor corresponds to the wire-like transmission member, and the film, for example, corresponds to the base material.

Herein, the through hole 35 is formed in an intermediate portion of the base material 34 in a width direction. The plurality of electrical wires 32 are disposed separately on both sides of the through hole 35. Herein, the through hole 35 may be formed in an end portion of the base material 34 in the width direction. The plurality of electrical wires 32 may be disposed collectively on only one side of the through hole 35.

The attachment part 40 includes a rod-like part 41, a fixing part 46, and a retaining part 50. The rod-like part 41 passes through the through hole 35. The fixing part 46 is provided to a first end portion 42 of the rod-like part 41. The retaining part 50 is provided to a second end portion 43 of the rod-like part 41. The fixing part 46 fixes the rod-like part 41 to the attachment target member 20. The retaining part 50 prevents the rod-like part 41 from coming out of the through hole 35. An outer size of the retaining part 50 is larger than a dimension of the through hole 35. The dimension of the through hole 35 is equal to or larger than a thickness of the rod-like part 41.

In the present embodiment, the fixing part 46 integrally fixes the attachment target member 20 and the rod-like part 41. Specifically, the fixing part 46 fixes the rod-like part 41 to the attachment target member 20 with solely the fixing part 46 without cooperation with the retaining part 50. The rod-like part 41 is previously provided to the attachment target member 20 by the fixing part 46 before being inserted into the through hole 35.

Herein, the fixing part 46 fixes the attachment target member 20 and the rod-like part 41 so that they are not detachable from each other. The fixing part 46 in this case may be a welding part in which the outer surface 21 of the attachment target member 20 and the first end portion 42 of the rod-like part 41 are welded, for example.

The fixing part 46 may detachably fix the attachment target member 20 and the rod-like part 41. In this case, for example, the first end portion 42 of the rod-like part 41 serves as a bolt part, and a protruding part is provided on a side closer to the second end portion 43 in relation to the bolt part. A fastening member fastened to the bolt part is provided. The fastening member and the protruding part sandwich the attachment target member 20 from sides opposite to each other while bolt passes through the attachment target member 20, thus the attachment target member 20 and the rod-like part 41 are detachably fixed to each other previously. The fixing part 46 in this case is the protruding part and the fastening member.

The rod-like part 41 is a stud bolt. The retaining part 50 is the fastening member fastened to the stud bolt 41. An outer size of the fastening member 50 is larger than the dimension of the through hole 35. The fastening member 50 is a cap or a nut, for example.

A locking concave part 44 is formed in an outer peripheral part of the stud bolt 41. An elastic locking piece 54 described hereinafter of the fastening member 50 is locked to a peripheral edge of the locking concave part 44. Herein, an annular groove is formed around a whole periphery of an outer surface of the second end portion 43 of the stud bolt 41 in a circumferential direction as the locking concave part 44. However, any shape is applicable as a shape of the locking concave part 44 as long as the elastic locking piece 54 can be locked thereto. A part of the stud bolt 41 in the circumferential direction may be formed to be partially concaved as the locking concave part 44. For example, an annular groove may be formed in a plurality of positions at intervals along an axial direction of the stud bolt 41. In this case, the stud bolt 41 has a shape in which an annular convex part and an annular concave part are alternately and continuously formed in the axial direction. For example, it is also applicable that a male thread is formed in the outer surface of the stud bolt 41 and a groove of the male thread serves as the locking concave part 44.

The fastening member 50 is a cap herein. The fastening member 50 includes a cap body 51, a flange 53, and the elastic locking piece 54. Herein, the fastening member 50 is a resin member integrally molded by the same resin material, for example.

The cap body 51 covers the stud bolt 41. The cap body 51 is formed into a tubular shape, and has an insert part 52 into which the stud bolt 41 is inserted. One side of the insert part 52 in an axial direction is opened. Herein, the other side of the insert part 52 in the axial direction is closed. The other side of the insert part 52 in the axial direction may be opened. Herein, a length dimension of the insert part 52 is smaller than that of the stud bolt 41. The length dimension of the insert part 52 may be equal to or larger than that of the stud bolt 41. A diameter of the insert part 52 is larger than that of the stud bolt 41.

The flange 53 extends outside from an outer peripheral part of the cap body 51. Herein, the flange 53 is provided to the outer peripheral part of one end portion of the cap body 51 in an axial direction. An outer size of the flange 53 is larger than the dimension of the through hole 35. Herein, the flange 53 is formed around the whole periphery of the cap body 51 in a circumferential direction. The flange 53 may be partially formed in a part along the circumferential direction of the cap body 51. The plurality of flanges partially extending in the circumferential direction of the cap body 51 may be formed at intervals along the circumferential direction of the cap body 51.

The elastic locking piece 54 is formed in an inner peripheral part of the cap body 51. The elastic locking piece 54 is locked to the peripheral edge of the locking concave part 44 of the stud bolt 41. The elastic locking piece 54 is elastically deformed so that it has contact with the outer peripheral part of the stud bolt 41 and increases a diameter thereof when the stud bolt 41 is inserted into the cap body 51. When the insertion of the stud bolt 41 into the cap body 51 proceeds and the elastic locking piece reaches the locking concave part 44, the elastic locking piece 54 is elastically restored and locked to a peripheral edge part of the locking concave part 44.

Any shape is applicable as a shape of the elastic locking piece 54 as long as the elastic locking piece 54 can be locked to the peripheral edge of the locking concave part 44 of the stud bolt 41. The elastic locking piece 54 may be formed around the whole periphery along the circumferential direction of the cap body 51. The elastic locking piece 54 may be partially formed in a part along the circumferential direction of the cap body 51. The plurality of elastic locking pieces 54 may be formed at intervals along the circumferential direction of the cap body 51. The elastic locking piece 54 may be formed only in one position along the axial direction of the cap body 51. The plurality of elastic locking pieces 54 may be formed at intervals along the axial direction of the cap body 51.

In FIG. 4, a dimension D1 indicates the outer size of the fastening member 50. Herein, the dimension D1 is an outer diameter of the circular flange 53. A dimension D2 indicates the dimension of the through hole 35. Herein, the dimension D2 is a diameter of the circular through hole 35. A dimension D3 indicates the thickness of the stud bolt 41. Herein, the dimension D3 is a diameter of the circular stud bolt 41.

The diameter D2 of the through hole 35 is equal to or larger than the diameter D3 of the stud bolt 41. The diameter D2 of the through hole 35 is preferably one-and-a-half times as large as the diameter D3 of the stud bolt 41 or more.

The outer diameter D1 of the flange 53 is larger than the diameter D2 of the through hole 35. The outer diameter D1 of the flange 53 is preferably twice as large as the diameter D2 of the through hole 35 or more.

When the flange 53 does not have the circular shape, the outer size D1 of the flange 53 may be replaced with a dimension of a part having a largest outer size in the flange 53. The dimension of the part having the largest outer size in the flange 53 can also be considered a length of a longest segment in segments connecting two points different from each other around the flange 53 in a plan view.

In the similar manner, when the through hole 35 does not have the circular shape, the dimension D2 of the through hole 35 may be replaced with a dimension of a part having a largest dimension in the through hole 35. The dimension of the part having the largest dimension in the through hole 35 can also be considered a length of a longest segment in segments connecting two points different from each other in the peripheral edge of the through hole 35 in a plan view.

In the similar manner, when the stud bolt 41 does not have the circular shape, the thickness D3 of the stud bolt 41 may be replaced with a dimension of a part having a largest outer size in the stud bolt 41. The dimension of the part having the largest outer size in the stud bolt 41 can also be considered a length of a longest segment in segments connecting two points different from each other around the stud bolt 41 in a plan view.

A fixing structure of the stud bolt 41 and the fastening member 50 is not limited thereto described above. For example, a cap which does not include the elastic locking piece 54 may be adopted as the fastening member. In this case, the stud bolt 41 is pressed into the cap body, thus the stud bolt 41 and the fastening member can be fixed to each other. A difference of a dimension between the stud bolt 41 and the cap body in pressing may be selected from a transition fit or interference fit regulated in JIS B401-1.

For example, a nut may be adopted as the fastening member in place of the cap. In this case, the stud bolt is provided with a male thread, and the nut is provided with a female thread. Then, the stud bolt and the nut are screwed together, thus the stud bolt and the fastening member can be fixed to each other. A general metric thread may be adopted as a thread standard. M4, M6, or M8, for example, may be adopted as a nominal diameter (size) of the metric thread. The nut may be a nut with the flange 53 or a nut without the flange 53.

When the stud bolt and the cap body are pressed together or when the stud bolt and the nut are screwed together, a dimension of the cap or the nut is preferably set to establish a relationship between the dimension D1, the dimension D2, and the dimension D3 described above.

As illustrated in FIG. 1, the plurality of attachment parts 40 are provided at intervals along the extension direction of the reinforcement 20. The flat wire harness 30 is attached using the plurality of attachment parts 40, thus the rotation of the flat wire harness 30 around attachment parts 40 is suppressed. Herein, one attachment part 40 is located in the circumferential direction of the reinforcement 20, however, the plurality of attachment parts 40 may be provided at intervals in the circumferential direction of the reinforcement 20.

Herein, the stud bolt 41 protrudes vertically upward from the reinforcement 20. A lower side of a part of the flat wire harness 30 provided with attachment part 40 is supported by the reinforcement 20. The stud bolt 41 may protrude in a direction other than vertically upward from the reinforcement 20. The stud bolt 41 may protrude in a horizontal direction or vertically downward from the reinforcement 20.

The flat wire harness 30 has rigidity large enough not to bow by a self-weight when a part of the flat wire harness 30 is supported in a posture where the width direction and the extension direction are parallel to the horizontal direction as illustrated in FIG. 3. The flat wire harness 30 and the reinforcement 20 are separated from each other in parts laterally separated along the horizontal direction with respect to a part where attachment part 40 is provided (parts located on right and left sides of attachment part 40 in FIG. 3). A configuration of the flat wire harness 30 having such rigidity is not particularly limited. For example, the base material 34 may be a sheet material having rigidity large enough not to bow by a self-weight. For example, it is also applicable that the base material 34 is a sheet material having flexibility and has rigidity of bowing by a self-weight, and a plurality of wiring bodies each including the wire-like transmission member 32 and the base material 34 are stacked and held in a stacked state to constitute the flat wire harness 30, thus the rigidity of the flat wire harness 30 is increased.

The flat wire harness 30 may have rigidity of bowing by a self-weight when a part of the flat wire harness 30 is supported in a posture where the width direction and the extension direction are parallel to the horizontal direction. In this case, the flat wire harness 30 may bow to have contact with the reinforcement 20 also in the parts laterally separated along the horizontal direction with respect to the part where attachment part 40 is provided.

When the flat wire harness 30 is attached using the stud bolt 41 and the fastening member 50, the stud bolt 41 extending straight in a direction perpendicular to the outer surface 21 of the reinforcement 20 is inserted into the through hole 35 as illustrated in FIG. 5. Next, the fastening member 50 is fastened to the tip end of the stud bolt 41. Herein, the cap-like fastening member 50 is pressed to the tip end of the stud bolt 41, thus the fastening member 50 is fastened to the tip end of the stud bolt 41. At this time, the fastening member 50 is moved along the stud bolt 41 while the elastic locking piece 54 has contact with the stud bolt 41 and increases the diameter thereof. Then, the elastic locking piece 54 is elastically restored in a predetermined position and locked to the locking concave part 44, thus the stud bolt

41 and the fastening member 50 are fastened. Accordingly, the flat wire harness 30 is attached to the reinforcement 20 to constitute the attachment structure 10 of the flat wire harness in a state illustrated in FIG. 1.

Effect Etc.

According to the attachment structure 10 of the flat wire harness having the above configuration, the diameter D2 of the through hole 35 is equal to or larger than the diameter D3 of the rod-like part 41, thus the attachment target part of the attachment target member 20 is visually recognized easily from the through hole 35 before the rod-like part 41 is inserted, and the rod-like part 41 is easily inserted into the through hole 35 at the time of the attachment operation of attaching the flat wire harness 30. Accordingly, the attachment operation of the flat wire harness 30 is simplified.

The fixing part 46 integrally fixes the attachment target member 20 and the rod-like part 41. In this case, the rod-like part 41 is also the attachment target part. Accordingly, the rod-like part 41 can be inserted into the through hole 35 by moving the base material 34, and the rod-like part 41 as the attachment target part can be visually recognized through the through hole 35. Accordingly, the attachment operation of the flat wire harness 30 is simplified.

The rod-like part 41 is the stud bolt 41, the retaining part 50 is the fastening member 50 fastened to the stud bolt 41, and the outer diameter D1 of the fastening member 50 is larger than the diameter D2 of the through hole 35. Accordingly, the fastening member 50 prevents the base material 34 from coming out of the stud bolt 41.

The locking concave part 44 is formed in the outer peripheral part of the stud bolt 41, the fastening member 50 includes a cap body 51 covering the stud bolt 41, the flange 53 protruding outside from the outer peripheral part of the cap body 51, and the elastic locking piece 54 formed in the outer peripheral part of the cap body 51 to be locked to the peripheral edge of the locking concave part 44 of the stud bolt 41, and the outer diameter D1 of the flange 53 is larger than the diameter D2 of the through hole 35. Accordingly, the fastening member 50 can be fastened by pressing the cap-like fastening member 50 to the stud bolt 41.

Embodiment 2

Figure 7:
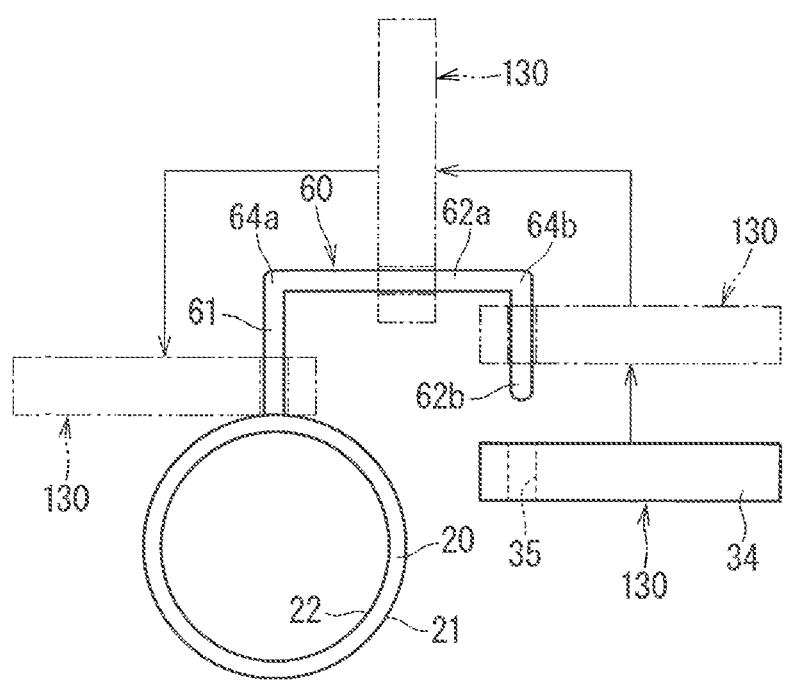
FIG. 7 is an explanation diagram illustrating attachment of the flat wire harness.

An attachment structure of a flat wire harness according to an embodiment 2 is described. FIG. 6 is a front view illustrating an attachment structure 110 of the flat wire harness according to the embodiment 2. FIG. 7 is an explanation diagram illustrating attachment of a flat wire harness 130. The same applies to each drawing hereinafter. In the following description, the same reference numerals are assigned to the similar constituent elements described above, and the description thereof will be omitted.

In the present embodiment, a pin 60 continuously formed is provided as a member constituting the rod-like part and the retaining part in place of the stud bolt 41 and the fastening member 50 described above. The pin 60 is integrally formed with the attachment target member 20 via a fixing part similar to the fixing part 46 of the stud bolt 41. Accordingly, the flat wire harness 130 can be attached to the attachment target member 20 by the pin 60 integrally formed with the attachment target member 20. Accordingly, a component in a separated form at a time of starting the attachment operation is reduced. The wire-like transmission member 32 is omitted in the flat wire harness 130 in FIG. 6 and FIG. 7. The flat wire harness 130 can have a configuration similar to that of the flat wire harness 30 except that a position of the through hole 35 is different from that of the through hole 35 in the flat wire harness 30 described above.

Herein, two bending parts 64 are provided to the pin 60. Two bending parts 64 are separately provided at intervals along an extension direction of the pin 60. Herein, in the pin 60, a part from a base end portion to a first bending part 64a serves as a rod-like part 61 and a part closer to a tip end portion in relation to the first bending part 64a serves as a retaining part 62. A part of the retaining part 62 between the first bending part 64a and a second bending part 64b is referred to as a first retaining part 62a, and a part thereof closer to the tip end portion in relation to the second bending part 64b is referred to as a second retaining part 62b. It is also applicable that the retaining part does not include the second retaining part 62b but includes only the first retaining part 62a.

In the present embodiment, the pin 60 has rigidity large enough to be hardly bended and deformed. The rigidity large enough to be hardly bended and deformed indicates rigidity large enough for an operator to hardly bend and deform the pin 60 with force of the operator. For example, the pin 60 is previously shaped into a bended state, or processed to be bended by a bender from a straight state, thus has a bended shape. For example, the pin 60 may be made up of two straight pins intersecting with each other and connected to each other at end portions by welding to have a bending shape.

The rod-like part 61 extends outward from the outer surface 21 of the reinforcement 20 along a first direction, and the retaining part 62 extends from the second end portion 43 of the rod-like part 61 along a second direction different from the first direction. Accordingly, the base material 34 is moved along the pin 60 toward a base end of the pin 60 while the tip end of the pin 60 is inserted into the through hole 35, thus the flat wire harness 130 can be attached to the attachment target member 20.

Herein, the second direction is an extension direction of the first retaining part 62a. Herein, the retaining part 62 is bended in a third direction intersecting with the second direction at an intermediate portion. The third direction is the extension direction of the second retaining part 62b. Herein, the second direction intersects with (perpendicular herein) an axial direction of the reinforcement 20. The third direction is perpendicular to the second direction. The third direction is parallel to the first direction.

In the present embodiment, the fastening member is not used, but the flat wire harness 130 is caught on the pin 60 and attached thereto. However, the fastening member may be attached to the pin 60 to suppress movement of the flat wire harness 130 with respect to the pin 60.

In attaching the flat wire harness 130 using the pin 60, the tip end of the pin 60 is inserted into the through hole 35, and the flat wire harness 130 is slid and moved toward the base end portion of the pin 60 as illustrated in FIG. 7. FIG. 7 illustrates the flat wire harness 130 before being inserted by a solid line, and the flat wire harness 130 after being inserted by a dashed-two dotted line. The flat wire harness 130 is slid and moved in a direction of an arrow in FIG. 7. When the flat wire harness 130 reaches a base end portion of the pin 60, the flat wire harness 130 is attached to the reinforcement 20 to constitute the attachment structure 110 of the flat wire harness in a state illustrated in FIG. 6.

The pin 60 includes the bending part 64, thus the flat wire harness 130 is rotated when passing through the bending part 64. Herein, the flat wire harness 130 is rotated 90 degrees in each bending part 64. Herein, the second retaining part 62b protrudes from the tip end of the first retaining part 62a to a side where the rod-like part 61 is located in parallel to the rod-like part 61, thus the flat wire harness 130 is rotated 180 degrees until the flat wire harness 130 reaches the base end of the pin 60 from tip end of the pin 60.

As illustrated in FIG. 7, the through hole 35 is provided to the end portion along the width direction of the base material 34 in the flat wire harness 130. Accordingly, when the flat wire harness 130 is rotated from the tip end of the pin 60 toward the base end of the pin 60, a part of the flat wire harness 130 on a side closer to the reinforcement 20 in relation to the pin 60 hardly interferes with the reinforcement 20.

Modification Example of Embodiment 2

Figure 8:
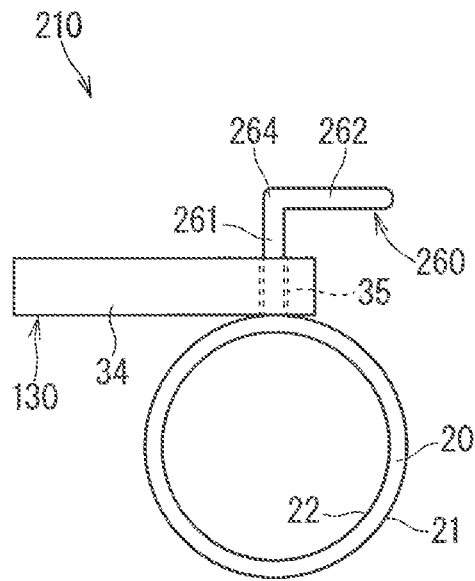
FIG. 8 is a front view illustrating a modification example of the attachment structure of the flat wire harness according to the embodiment 2.
Figure 9:
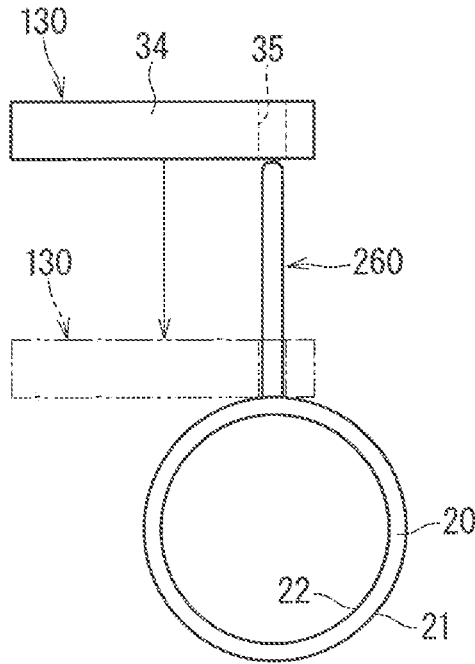
FIG. 9 is an explanation diagram illustrating attachment of the flat wire harness.
Figure 10:
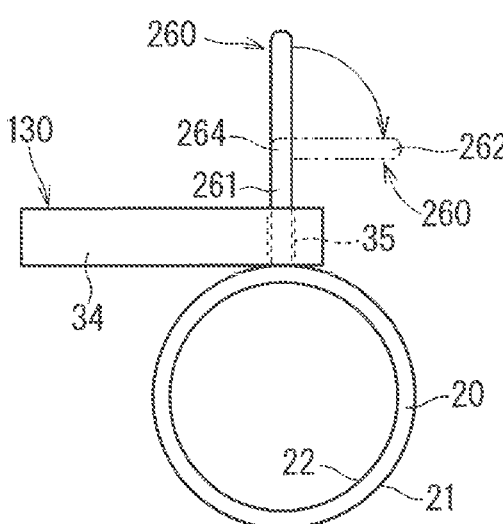
FIG. 10 is an explanation diagram illustrating attachment of the flat wire harness.

FIG. 8 is a front view illustrating a modification example of the attachment structure 110 of the flat wire harness according to the embodiment 2. FIG. 9 and FIG. 10 are explanation diagrams each illustrating attachment of the flat wire harness 130.

In an attachment structure 210 of a flat wire harness according to the present modification example, the flat wire harness 130 is attached using a pin 260 in the manner similar to the attachment structure 110 of the flat wire harness according to the embodiment 2. In the attachment structure 210 of the flat wire harness, rigidity of the pin 260 is different from that of the pin 60 in the attachment structure 110 of the flat wire harness.

Specifically, the pin 260 has rigidity of being bendable and deformable and being able to keep a state of being bended and deformed. Herein, the state where the pin 260 has rigidity of being bendable and deformable indicates that the operator can bend and deform the pin 260 at a time of attaching the flat wire harness 130. The state where the pin 260 has rigidity of being able to keep a state of being bended and deformed indicates that the state of being bended and deformed can be kept so that the flat wire harness 130 does not come out while the pin 260 is bended and deformed.

The pin 260 is bended and deformed so that a part thereof is located on an outer side of the through hole 35. Accordingly, the pin 260 passing through the through hole 35 is bended and deformed, thus the flat wire harness 130 is attached to the reinforcement 20.

In the example illustrated in FIG. 8, the pin 260 is bended on a side closer to the tip end in relation to the through hole 35. In this case, a part of the pin 260 closer to a base end portion in relation to a bending part 264 serves as a rod-like part 261, and a part thereof closer to a tip end portion in relation to the bending part 264 serves as a retaining part 262. The pin 260 may be bended on a side closer to the base end in relation to the through hole 35. It is also applicable that the pin 260 is bended in a base end portion with respect to the reinforcement 20, and extends straight in a direction intersecting with the extension direction of the through hole 35 from the reinforcement 20. In this case, it can be deemed that the pin 260 does not include the bending part 264.

In the example illustrated in FIG. 8, the tip end of the pin 260 extends toward outside in the width direction of the reinforcement 20. The tip end of the pin 260 may extend along the axial direction of the reinforcement 20. In the example illustrated in FIG. 8, the through hole 35 is formed in one end portion of the base material 34 in the width direction, and the tip end of the pin 260 extends in a direction (right direction in a paper sheet of FIG. 8) opposite to a direction (left direction in a paper sheet of FIG. 8) toward the other end portion of the base material 34. The tip end of the pin 260 may extend in a direction toward the other end portion of the base material 34. The through hole 35 may be formed in an intermediate portion of the base material 34 in the width direction.

In attaching the flat wire harness 130 using the pin 260, the pin 260 before being bended and deformed is firstly inserted into the through hole 35, and the flat wire harness 30 is slid and moved toward the base end portion of the pin 260 as illustrated in FIG. 9. FIG. 9 illustrates the flat wire harness 130 before being inserted by a solid line, and the flat wire harness 130 after being inserted by a dashed-two dotted line. When the pin 260 is inserted into the through hole 35, as illustrated in FIG. 9, the pin 260 before being bended and deformed extends straight in a direction perpendicular to the outer surface 21 of the reinforcement 20, thus the flat wire harness 130 can be easily slid and moved along the pin 260. Each of the plurality of pins 260 can be also inserted into the corresponding through hole 35 easily.

When the flat wire harness 130 reaches the base end portion of the pin 260, the pin 260 is bended and deformed next as illustrated in FIG. 10. FIG. 10 illustrates the pin 260 before being bended and deformed by a solid line, and the pin 260 after being bended and deformed by a dashed-two dotted line. When the plurality of pins 260 are located, the plurality of pins 260 may be bended in the same direction, or may also be bended in a direction different from each other. The pin 260 is bended and deformed, thus the flat wire harness 130 is attached to the reinforcement 20 to constitute the attachment structure 210 of the flat wire harness in a state illustrated in FIG. 8.

Embodiment 3

An attachment structure of a flat wire harness according to an embodiment 3 is described. FIG. 11 is a front view illustrating an attachment structure 310 of the flat wire harness according to the embodiment 3. FIG. 12 is an explanation diagram illustrating attachment of a flat wire harness 130.

The attachment structure 310 of the flat wire harness is different from the attachment structures 10, 110, and 210 of the flat wire harness described above in that the rod-like part is a member provided separately from the reinforcement 20. In this case, a fixing part for fixing the rod-like part to the reinforcement 20 includes an insert hole 23 formed in the reinforcement 20. The rod-like part is inserted into the insert hole 23.

In the present embodiment, a bolt 70 including a shaft 71 and a head 72 and a fastening member 74 fastened to the bolt 70 are provided. The shaft 71 serves as the rod-like part. The head 72 serves as one of the fixing part and the retaining part. The fastening member 74 serves as one of the fixing part and the retaining part. In the example illustrated in FIG. 11, the head 72 serves as the retaining part and the fastening member 74 serves as a fixing part. In this case, the bolt 70 is inserted into the insert hole 23 from an outer side of the reinforcement 20. When the head 72 serves as the fixing part and the fastening member 74 serves as the retaining part, the bolt 70 is inserted into the insert hole 23 from an inner side of the reinforcement 20.

The insert hole 23 has a circular shape. A dimension of the insert hole 23 is equal to a diameter of the insert hole 23. The diameter of the through hole 35 is larger than the diameter of the insert hole 23. Accordingly, the insert hole 23 is visually recognized through the through hole 35 easily, thus the bolt 70 can be easily inserted into the through hole 35 in the base material 34 and the insert hole 23 in the reinforcement 20. When the insert hole 23 does not have the circular shape, the dimension of the insert hole 23 may be replaced with a dimension of a part having a largest dimension in the insert hole 23. The dimension of the part having the largest dimension in the insert hole 23 can also be considered a length of a longest segment in segments connecting two points different from each other in the peripheral edge of the insert hole 23 in a plan view.

Herein, the fastening member 74 is a nut. In this case, it is sufficient that a washer 76 is provided between the base material 34 and the head 72 or the fastening member 74 serving as the retaining part. The washer 76 is provided, thus distortion of the peripheral edge portion of the through hole 35 in the base material 34 is suppressed at a time of screwing the bolt 70.

It is also applicable that the washer 76 may include protrusions such as teeth of a toothed washer, and the protrusions dig into a base material. Accordingly, rotation of the washer 76 around the base material 34 is suppressed at the time of screwing the bolt 70, and the peripheral edge portion of the through hole 35 in the base material 34 is hardly distorted when the bolt 70 is screwed.

In attaching the flat wire harness 130 using the bolt 70 and the fastening member 74, as illustrated in FIG. 12, the flat wire harness 130 and the reinforcement 20 are positioned so that an axial direction of the through hole 35 in the base material 34 and an axial direction of the insert hole 23 in the reinforcement 20 coincide with each other. At this time, the operator can visually recognize the insert hole 23 through the through hole 35, thus the positioning can be easily performed. When the positioning is completed, the bolt 70 is inserted into the through hole 35 and the insert hole 23, and the fastening member 74 is fastened to the tip end of the bolt 70. The bolt 70 and the fastening member 74 are fastened, thus the flat wire harness 130 is attached to the reinforcement 20 to constitute the attachment structure 310 of the flat wire harness in a state illustrated in FIG. 11.

Embodiment 4

Figure 15:
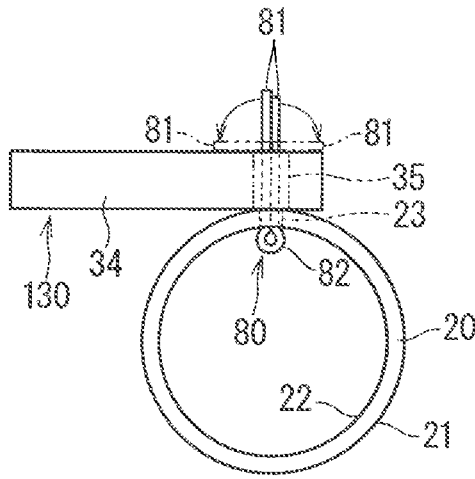
FIG. 15 is an explanation diagram illustrating attachment of the flat wire harness.

An attachment structure of a flat wire harness according to an embodiment 4 is described. FIG. 13 is a front view illustrating an attachment structure 410 of the flat wire harness according to the embodiment 4. FIG. 14 and FIG. 15 are explanation diagrams each illustrating attachment of the flat wire harness 130.

The present embodiment is different from the embodiment 3 in that a split pin 80 is provided as a member inserted into the insert hole 23 and the through hole 35 in place of the bolt 70.

The split pin 80 includes a tail 81 and a head 82. The tail 81 includes a part serving as a rod-like part and a part serving as one of the fixing part or the retaining part. The head 82 serves as the other one of the fixing part and the retaining part. Also in the present embodiment, in the manner similar to the embodiment 3, the fixing part includes the insert hole 23 formed in the reinforcement 20. Accordingly, the insert hole 23 is visually recognized through the through hole 35 easily, thus the tail 81 can be easily inserted into the through hole 35 in the base material 34 and the insert hole 23 in the attachment target member 20.

Two tails 81 are provided. Each tail 81 extends in a long side. The head 82 connects one ends of two tails 81. The head 82 is formed into an annular shape. A diameter of the head 82 is larger than that of the insert hole 23. Herein, the tail 81 serves as the retaining part and the head 82 serves as the fixing part. In this case, the split pin 80 is inserted into the insert hole 23 from the inner side of the reinforcement 20. When the tail 81 is the fixing part and the head 82 is the retaining part, the split pin 80 is inserted into the insert hole 23 from the outer side of the reinforcement 20.

The bending state of the tail 81 is not particularly limited as long as it can hold the flat wire harness 130. For example, in the example illustrated in FIG. 13, a bending part 81c is provided to a part of the tail 81 closer to the tip end portion in relation to the through hole 35. In this case, a part closer to the base end portion in relation to the bending part 81c serves as a rod-like part 81a, and a part closer to the tip end portion in relation to the bending part 81c serves as a retaining part 81b. In the tail 81, the bending part 81c may be provided to an inner part of the through hole 35 or a part closer to the base end portion in relation to the through hole 35. The bending part 81c may not be provided to the tail 81. In this case, it is also applicable that the tail 81 extends straight obliquely from a connection part where the tail 81 is connected to the head 82, and a part closer to the tip end in relation to the through hole 35 is located on an outer peripheral side of the through hole 35.

In addition, for example, both two tails 81 are bended and deformed in the example illustrated in FIG. 13. Only one of two tails 81 may be bended and deformed. For example, tip ends of two tails 81 extend in a direction opposite to each other in the example illustrated in FIG. 13. The tip ends of two tails 81 may extend in the same direction. The tip ends of two tails 81 may extend in a direction intersecting with each other in a plan view. For example, in the example illustrated in FIG. 13, the tip end of the tail 81 extends along the width direction of the base material 34. The tip end of the tail 81 may extend along the extension direction of the base material 34.

In attaching the flat wire harness 130 using the split pin 80, as illustrated in FIG. 14, the flat wire harness 130 and the reinforcement 20 are firstly positioned so that the axial direction of the through hole 35 in the base material 34 and the axial direction of the insert hole 23 in the reinforcement 20 coincide with each other. Then, the split pin 80 whose tail 81 remains straight is inserted into the through hole 35 and the insert hole 23, and the head 82 is slid and moved toward the base material 34. Herein, the split pin 80 is inserted from the inner side of the reinforcement 20. In this case, the split pin 80 is inserted until the head 82 comes in contact with the inner surface 22 of the reinforcement 20. FIG. 14 illustrates the split pin 80 before being inserted by a solid line, and the split pin 80 after being inserted by a dashed-two dotted line. When the split pin 80 is inserted into the through hole 35 and the insert hole 23, a thickness of the split pin 80 is equal to or smaller than the diameter of the insert hole 23 and the diameter of the through hole 35, thus is easily inserted. The thickness of the split pin 80 is equal to a sum of thicknesses of two tails. The tail 81 of the split pin 80 before being bended and deformed extends straight, thus the head 82 can be easily moved toward the base material 34.

When the head 82 reaches the inner surface 22 of the reinforcement 20, the tail 81 is bended and deformed next as illustrated in FIG. 15. FIG. 15 illustrates the split pin 80 before being bended and deformed by a solid line, and the split pin 80 after being bended and deformed by a dashed-two dotted line. The tail 81 is bended and deformed, thus the flat wire harness 130 is attached to the reinforcement 20 to constitute the attachment structure 410 of the flat wire harness in a state illustrated in FIG. 13.

APPENDIX

The configurations described in the embodiments and modification examples thereof can be appropriately combined as long as they are not contradictory. For example, when the plurality of attachment parts are provided, also adoptable is an attachment part having a different configuration as a first attachment part and a second attachment part in the plural types of attachment part described above.

While the invention has been shown and described in detail, the foregoing description is in all aspects illustrative and not restrictive. It is therefore understood that numerous modifications and variations can be devised without departing from the scope of the invention.

What is claimed is:

1. An attachment structure of a flat wire harness, comprising:

an attachment target member;

the flat wire harness disposed along an outer surface of the attachment target member; and an attachment part attaching the flat wire harness to the attachment target member, wherein the flat wire harness includes a plurality of wire-like transmission members and a base material holding the plurality of wire-like transmission members in a flatly-arranged state, a through hole is formed in a part of the base material where the plurality of wire-like transmission members are not disposed, the attachment part includes a rod-like part passing through the through hole, a fixing part provided to a first end portion of the rod-like part to fix the rod-like part to the attachment target member, and a retaining part provided to a second end portion of the rod-like part to prevent the rod-like part from coming out of the through hole, an outer size of the retaining part is larger than a dimension of the through hole, and the dimension of the through hole is equal to or larger than a thickness of the rod-like part, the fixing part integrally fixes the attachment target member and the rod-like part, the rod-like part is a stud bolt, the retaining part is a fastening member fastened to the stud bolt, an outer size of the fastening member is larger than the dimension of the through hole, a locking concave part is formed in an outer peripheral part of the stud bolt, the fastening member includes a cap body covering the stud bolt, a flange extending to an outer side from an outer peripheral part of the cap body, and an elastic locking piece formed in an inner peripheral part of the cap body to be locked to a peripheral edge of the locking concave part of the stud bolt, and an outer size of the flange is larger than the dimension of the through hole.

* * * * *